United States Patent [19]
Merrick et al.

[11] Patent Number: 5,808,612
[45] Date of Patent: Sep. 15, 1998

[54] VIRTUAL OFFICE WITH CONNECTIONS BETWEEN SOURCE DATA MACHINE, AND A VIEWER OBJECTS

[75] Inventors: Roland Albert Merrick, Worcestershire; Justin James Campling Richards, Warwick, both of United Kingdom

[73] Assignee: International Business Machines Corporation, Armonk, N.Y.

[21] Appl. No.: 698,072

[22] Filed: Aug. 15, 1996

[30]   Foreign Application Priority Data

Jan. 12, 1996 [GB] United Kingdom .................. 9600685

[51] Int. Cl.$^6$ ........................................ G06F 3/00
[52] U.S. Cl. ........................ 345/351; 345/350; 345/355; 345/967; 345/968; 345/970
[58] Field of Search ................................. 345/326–358, 345/967, 968, 970; 707/3–5; 395/701–704

[56]   References Cited

U.S. PATENT DOCUMENTS

| | | | |
|---|---|---|---|
| 4,914,568 | 4/1990 | Kodosky et al. | 395/967 X |
| 5,347,628 | 9/1994 | Brewer et al. | 345/355 |
| 5,377,318 | 12/1994 | Wolber | 345/967 X |
| 5,404,400 | 4/1995 | Nobuo . | |
| 5,490,246 | 2/1996 | Brotsky et al. | 345/967 X |
| 5,517,663 | 5/1996 | Kahn | 345/355 X |
| 5,566,294 | 10/1996 | Kojima et al. | 345/355 X |
| 5,590,271 | 12/1996 | Klinker | 345/967 X |

OTHER PUBLICATIONS

Benford et al., "Supporting Cooperative Work in Virtual Environments", The Computer Journal, pp. 653–667, 1994.
Carlsson et al., "DIVE–A Multiuser Virtual Reality System", IEEE, pp. 395–400, Sep. 18, 1993.
Vose et al., "LabView: Laboratory Virtual Instrument Engineering Workbench", Byte, pp. 84–92, Sep. 1986.
Search Report under Section 17(5), Application No. 9600685.3, The Patent Office, Newport, Gwent, United Kingdom, Mar. 27, 1996, Matthew Gillard.

*Primary Examiner*—John E. Breene
*Attorney, Agent, or Firm*—Edward H. Duffield

[57]   ABSTRACT

The present invention provides a system and method for displaying on a display device (20) connectable to the system a visual representation of a physical environment, such as a virtual office. The system includes display controls (30) for displaying objects in the physical environment including a data management object, one or more data objects representing data sources, and one or more output objects representing paths through which data from a data source can be presented to a user. A user-operated device (50) is connectable to the system to allow a user to interact with the objects. The system includes data receiving means (70), responsive to signals from the user-operated device (50) indicating user association of one or more data objects with the data management object, to access the data represented by the one or more associated data objects. Additionally, processor (90) is provided for performing selected processing operations on the retrieved data, and an output device (100) is employed to pass the data processed by the processor to a selected output object. The use of the data management object simplifies the user's interactions with, and access to, data, and provides a common mechanism for connecting any input data to any output objects, and optionally, for processing that data on its way to the output object. It also provides a mechanism for performing relational database queries in a vastly simplified manner adhering to a concrete, accessible, real-world metaphor.

11 Claims, 5 Drawing Sheets

5,808,612

VIRTUAL OFFICE WITH CONNECTIONS BETWEEN SOURCE DATA MACHINE, AND A VIEWER OBJECTS

FIELD OF THE INVENTION

The present invention relates generally to data processing systems having user interfaces which display to the user a visual representation of a physical environment, and in particular to the manipulation of data in such systems.

BACKGROUND INFORMATION

User interfaces allow the computer user to interact or communicate with the computer system. User interfaces are typically implemented with a display screen and a user-controlled entry device, such as a keyboard, mouse, light pen or the like. The display screen displays information and data to the user and the user uses the entry device to give commands and provide information to the computer system.

During recent years, more and more people have wanted and needed to use the power of the computer in their daily work. However, generally these users do not want to be required to know specific commands, operators, syntax rules, etc., and much work has been expended on developing user interfaces which alleviate the need for such levels of knowledge. Nowadays, many user interfaces present the user with windows and icons. Windows typically include a title bar, an action bar, and a client area. The work or "client" area may typically include a number of icons, which are small stylized representation of entities (applications, folders, etc.) with which the user works. These user interfaces are an improvement over the previous lower level interfaces, but still have some shortcomings. For instance, the interaction with icons is not completely intuitive, and an inexperienced user must resort to online helps and tutorials, including help windows, in order to operate the system.

Hence, to improve the intuitive nature of user interfaces, there is currently a trend towards developing user interfaces for computer systems which resemble actual physical environments that users can relate to; for the purpose of this patent application, this type of user interface will be referred to as a 'Places' user interface. As an example of such a user interface, the user may be presented with a representation of a work area such as an office. Typically this presentation would be via a display screen, and may be either a two-dimensional or (pseudo) three-dimensional representation. Alternatively, with the advent of virtual reality headsets and the like, the user may be presented with a 3D virtual office through the VR headset.

Within this representation of a physical environment, a number of useful objects are displayed to the user. For the work area example mentioned above, these objects might be a desk, chairs, telephone, calendar or diary, display screen, speakers, filing cabinets, etc. Hence, the user is presented with an interface which is completely intuitive to him/her. To perform a particular function, the aim is for the user to interact with the objects within the context of the physical environment forming the Places user interface. Associated with these objects will be the particular software routines required to perform the desired function. Hence, if the user wishes to see what he/she has scheduled for a particular day, the user can move to, or point to, the calendar or diary object, and then review the entries therein for the day of interest. As another example, if the user wishes to access files giving personnel information, he/she might proceed by opening a drawer or filing cabinet in which the personnel information is kept. This type of action is discussed in more detail in U.S. Pat. No. 5,347,628, which is incorporated herein by reference for inclusion of its teaching for such devices and methods of operation.

Hence, it can be seen that, with 'Places' user interfaces, the user manipulates software in the form of objects depicted within the context of the current environment, or 'Place'. 'Places' user interfaces are beginning to appear on the market, for example in Microsoft Corporation's 'Bob', Packard Bell's 'Navigator', and Edmark's 'KidDesk'.

In the environment presented by such Places user interfaces, there is a need to relate the various functionality already available to the computer user through existing and standard user interfaces and application software to intuitive objects in the Places environment.

One important function addressed by computing software today is that of accessing and manipulating data, for example data stored in a database. However data is not an object in the conventional sense. It is comprised entirely of content, even though some of that content—the attributes—may relate to default ways in which that data may be displayed. To be perceived by the user, the data must be coupled with an output viewer object. Today, typically, a default viewer is associated with data and used to display that data at the user's request. That viewer may typically be a matrix of rows and columns showing the database's cellular data in its tabular form.

However, as databases have become more sophisticated, the alpha-numeric data typically shown in a tabular or cellular display is joined by the more complex data types increasingly supported by relational databases. These data types include sound, image, video, etc. which do not easily lend themselves to tabular display and lose relevance and context when shown in some representational form such as an iconic depiction of the data type itself—a picture of a microphone for a sound bite; a camera for an image; a television for a video sequence; etc.

Another consideration is that the data may be presented in various different forms. Today's default tabular display may be entirely inappropriate for alpha-numeric data as well as other data types. Some alpha-numeric data is of value only when presented in a particular form. For example, the data which is used to create this document is only useful when coupled with editor software which can interpret the text and control information embedded within it. Only the user knows how best to present the data—as a table, a chart, a summary report, a logic diagram.

In certain cases, the data and the output viewer object which presents it will be tightly-coupled. There will be a one-for-one match, or an obvious display engine; the data will be intrinsic to the output viewer object. However, this is not the case in many situations. As a common example, consider a traditional relational database or the vast amounts of 'raw' data currently stored in this format which is separate from the viewer mechanism.

It is hence an object of the present invention to provide a system which enables the access and manipulation of data to be performed in an intuitive manner within a Places user interface.

DISCLOSURE OF THE INVENTION

Accordingly, the present invention provides a system for displaying on a display device connectable to the system a visual representation of a physical environment, the system having display means for displaying objects in the physical environment including a data management object, one or more data objects representing data sources, and one or more output objects representing means through which data from a data source can be presented to a user, a user-operated device connectable to the system to allow a user to interact with the objects, the system further comprising: data receiving access means, which is responsive to signals from the user-operated device indicating the desired user association of one or more data objects with the data management object, to access the data represented by the one or more associated data objects; processing means for performing selected processing operations on the retrieved data; and output means for passing the data processed by the processing means to a selected output object.

In preferred embodiments, the data management object has data manipulation controls displayed in association therewith, the selected processing operation performed by the processing means being determined by a user selection of said data manipulation controls. Preferably, these data manipulation controls are incorporated as part of the data management object. The data manipulation controls may be of any appropriate type that enable the user to enter processing commands for the data. As an example, the controls may be such as to enable data queries to be specified by the user. The display of these controls in association with the data management object provides a particularly intuitive technique for the user to enter desired processing operations.

Various forms of display may be provided to assist the user in connecting data objects and output objects to the data management object. In preferred embodiments, the display means is arranged to display connection leads in the physical environment, the user association of one or more data objects with the data management object resulting from user manipulation, via the user-operated device, of a connection lead to connect a selected data object with the data management object. Also, in preferred embodiments, a mechanism is provided for allowing the user to select the output object via the user-operated device.

The physical environment may be represented in either two dimensions or three dimensions. In preferred embodiments, the physical environment is represented as a three-dimensional environment, and the physical environment represented is a work area. Further, the data management object is preferably represented as an intuitive real-world object.

Viewed from a second aspect, the present invention provides a software implemented tool for use in a system of the type discussed above, the tool comprising: computer executable steps of a process, which may be recorded on any suitable machine-readable medium, for specifying to the display means the form of the data management object to be displayed in the physical environment; the data receiving means; and the processing means.

Viewed from a third aspect, the present invention provides a method of operating a data processing system arranged to display on a display device connectable to the system a visual representation of a physical environment, the method comprising: (a) employing a display means to display objects in the physical environment including a data management object, one or more data objects representing data sources, and one or more output objects representing means through which data from a data source can be presented to a user; (b) responsive to signals received from a user via a user-operated device connectable to the system indicating user selected association of one or more data objects with the data management object, and employing a data receiving means to access the data represented by the one or more associated data objects; (c) employing a processing means to perform selected processing operations on the accessed and retrieved data; and (d) passing the data processed by the processing means to a selected output object.

As already mentioned, data cannot be perceived unless it is coupled with an output object (a viewer). In this way, even traditional alpha-numeric data is similar to the time-based media which are also beginning to be stored in databases. The data can be considered as being held on a medium, like a cassette, an audio CD, or a video tape. Without a player to present the realized output form of the data, it is inaccessible and cannot be displayed or perceived. It can still be manipulated as 'raw' data—stored, deleted, indexed, etc., but it cannot be realized to the user in final form.

The invention alleviates this problem by providing a system in which existing front-end processing of data, such as the existing query presentation "front end" of a database, can be provided in a Places environment by means of a data management object, or what we shall refer to hereafter as a 'Data Machine'. This data machine accesses and feeds data to one or more output objects (or viewers) which present that data visually to the user.

BRIEF DESCRIPTION OF THE DRAWINGS

The present invention will be described further, by way of example only, with reference to a preferred embodiment thereof as illustrated in the accompanying drawings, in which.

DESCRIPTION OF A PREFERRED EMBODIMENT

Figure 3:
FIG. 3 illustrates how the data machine is connected between a data object and an output object.

In the preferred embodiment, we will consider a system in which the data to be presented to the user is stored in a database. The system of the preferred embodiment incorporates a 'Data Machine' which is provided to access and deliver data from the database to output objects or viewers; FIG. 3 illustrates the connections made. It can be viewed as analogous to a hi-fi amplifier, which enables the data on a medium to be realized at an output object (in the case of the amplifier, the speakers). In preferred embodiments, the user is presented with an intuitive way of connecting the appropriate data from the database into the data machine, and to the desired output object(s) from the data machine.

Figure 1:
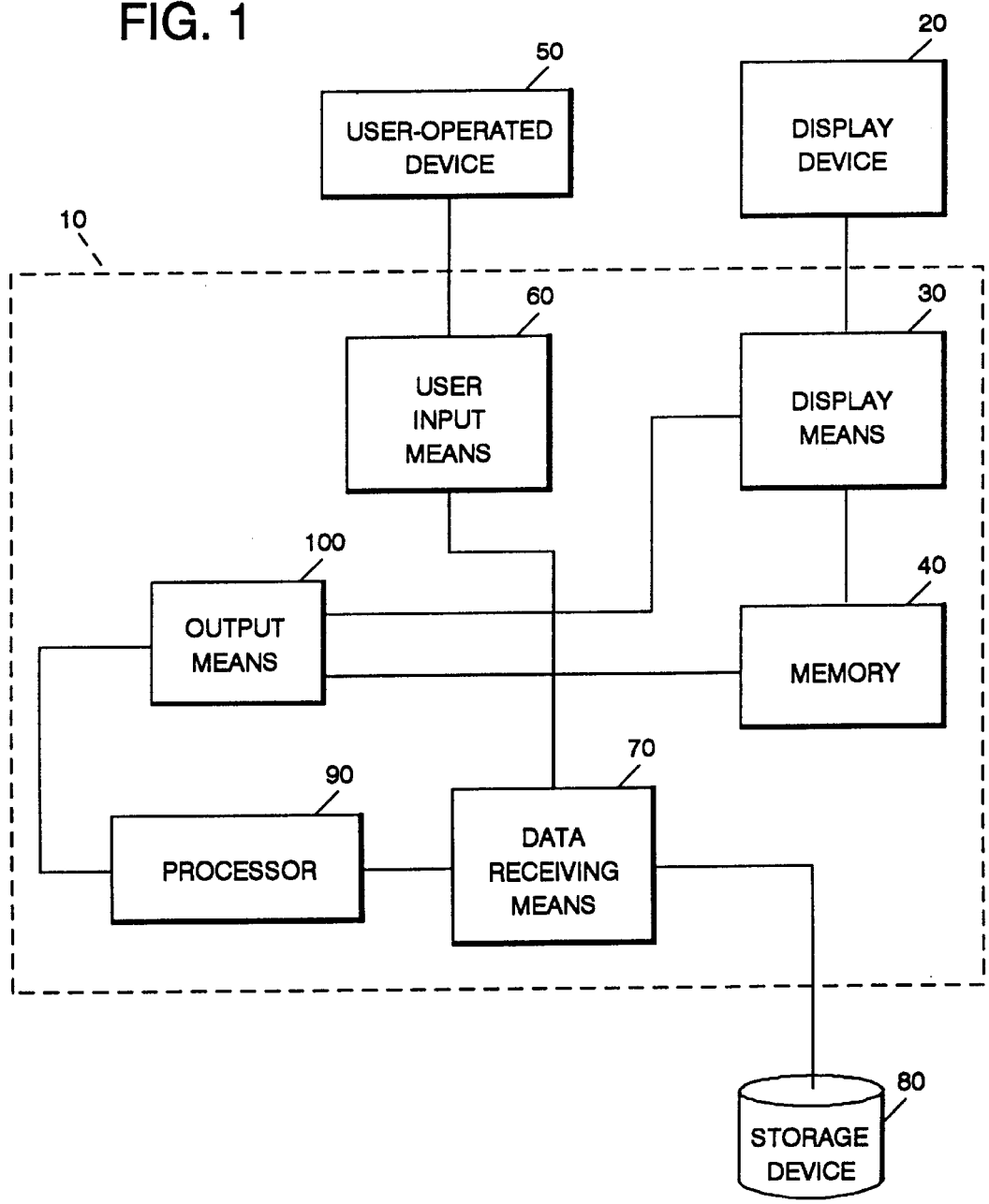
FIG. 1 is a block diagram of a system constructed in accordance with the preferred embodiment of the present invention.

With reference to FIG. 1, the system of the preferred embodiment will now be discussed. The system 10 is connectable to a display device 20 on which a visual representation of a physical environment is presented to the user. In the preferred embodiment, the display device is a computer terminal and the physical environment is presented on the display screen as either a two-dimensional or (pseudo) three-dimensional representation. However, as already mentioned, any other suitable display device may be used. For example, with the advent of virtual reality headsets and the like, the user may be presented with a 3D virtual office through the VR headset.

The display means 30 is used to control the display of information on the display device 20. In the preferred embodiment, the physical environment represented on the display device is a working area such as an office, and the display means is arranged to create a display within that work area a number of objects, such as a desk, telephone, diary, etc. Additionally, the display means 30 controls displays of one or more data objects representing data accessed from the database (i.e., the data source), and one or more output objects representing available viewers through which the data can be presented to the user. The output object may take the visual form of a book, such as that illustrated in FIG. 5, where the various pages of the book represent different output viewers such as spreadsheets and chart packages.

In addition to the data objects and output objects, the display means 30 is also arranged to create a display of a Data Machine object (see for example the data machine illustrated in FIGS. 5 and 6), through which the user may connect data to a suitable viewer. A memory 40 is provided in which the processor of the system stores data defining the visual representation of the physical environment and data defining the various objects used within that environment.

The user interacts with the objects displayed on the display device 20 by use of a user-operated device 50 connected to the system. Preferably this is a pointing device such as a mouse, whereby the user can select an object by moving a pointer on the screen over the object of interest and pressing a mouse button to select that object. Input from the user-operated device 50 is received by a user input means 60. If the information received by the user input means 60 indicates that the user has associated one or more data objects with the Data Machine object, then the user input means 60 notifies the data receiving means 70 accordingly.

The data receiving means 70 then uses information from the user input means 60 about the data object(s) that has/have been associated with the data machine to access from a storage device 80 the corresponding data represented by the data object(s). It will be apparent that the system could be arranged so that the data receiving means either actively retrieves the data from storage device 80, or alternatively is arranged to receive the data as it is sent from the storage device.

Once the data has been received, the data receiving means 70 passes that data to processor 90, where any default or user specified processing is performed. This will be discussed later in more detail with reference to the flow diagram of FIG. 2. Once the processing has been performed, the processed data is passed by the output means 100 to a selected output object. The output object may be specifically chosen by the user, or may be a default output object selected as being appropriate for the type of data being processed (e.g.—speakers for audio data, etc.). The software associated with the particular output object will prepare the data for presentation on the display device (e.g. as a spreadsheet), and the display means 30 will then be used to display the data on the display device.

From the above description of FIG. 1, it will be apparent that, in accordance with the preferred embodiment, the user can view (or perceive) data on a selected output object by associating that data with an intermediate object, referred to as the data machine object. If necessary, a particular output object can be specified, but otherwise a default output object will be used. The user can also interact with the data machine object to enter specific processing instructions, etc.

There is value in separating the Data Machine from the database rather than trying to connect the output object and database directly. This enables the user to determine which data to connect in from potentially multiple, disparate data sources. The data must be rendered to the data machine in a specified format (which preferably would be an industry standard mechanism like Open Database Connectivity (ODBC) or Integrated Database Application Programming Interface (IDAPI)), but can come from any source(s) capable of that rendering, and is not restricted to a database as such. Also, the provision of a discrete Data Machine enables the user to pre- and post-process data entering and leaving the machine.

Once the user has connected the data and, if necessary, the output viewer(s), s/he may instruct the Data Machine to 'play' the data. In preferred embodiments, a visual indication will be provided on the Data Machine to indicate that the data is being fed through the Machine to the viewer object. The user may, for example, see a counter indicating the number of rows of data read so far. This is analogous to other standard media players which show they are 'playing'. Additional media-player controls on the Data Machine may allow the user to stop the flow of data and display just those rows so far delivered, or to cancel the operation entirely. If the output object presents a summary display, the user would preferably have the option to show the desired output 'building up' as the data is fed through. Another option may be to 'play' only a pre-set amount of data through the Data Machine.

Because of the media-player metaphor on which the Data Machine is conceptually and visually based, the user will have little trouble coping with these and other operations which are not necessarily intuitive when portrayed in a more traditional manner against a database operation.

It is important to note that the Data Machine should be able to accept data from any source capable of rendering it in an acceptable format, and not just data held in relational form. Also, the data from the Data Machine can be output to any output object which presents information such that the user can perceive it. The nature of the output object determines how the input data is manifested to the user. So, for example, a text document can be fed through the Data Machine to a document viewer and rendered as a final-form textual document. Equally, the document could be fed through to a speech synthesis and speaker object and the text converted to speech and 'read' to the user.

While the user can explicitly 'wire up' the Data Machine to the data sources and output objects (see the FIG. 5 example), the Machine itself could have some built-in intelligence such that it can determine, based on data types and volumes, what aspects of the output require what columns of data to be supplied. The Machine could then do the wiring and feed the chosen columns to the particular output object. In cases where it is not clear either what data columns to take from the Data Machine to the output object, or exactly how to connect them up (for example, a specific column from the Data Machine may be valid for the X axis of a chart, but only the user may know what s/he wants to plot on the Y axis against the X axis), the user would have to make the connections explicitly. Graphically, these 'loose' connections can be depicted as trailing wires ready for the user to connect up. Different types of connectors on the ends of each wire can indicate the valid connection sockets in the Data Machine and the output objects.

From the above description, it will be apparent that the data machine can be used in the representation of the physical environment to handle all interfaces to data. It is important that the mechanisms described above be made extensible so that outputs can be added over time. The Data Machine is basically open-ended, so that any data sources or output objects can be connected in the future as they are developed. In this way, both users and third parties can add additional capabilities by providing new objects, either to provide or view data, or as transform objects to be connected into the data chain.

Figure 4:
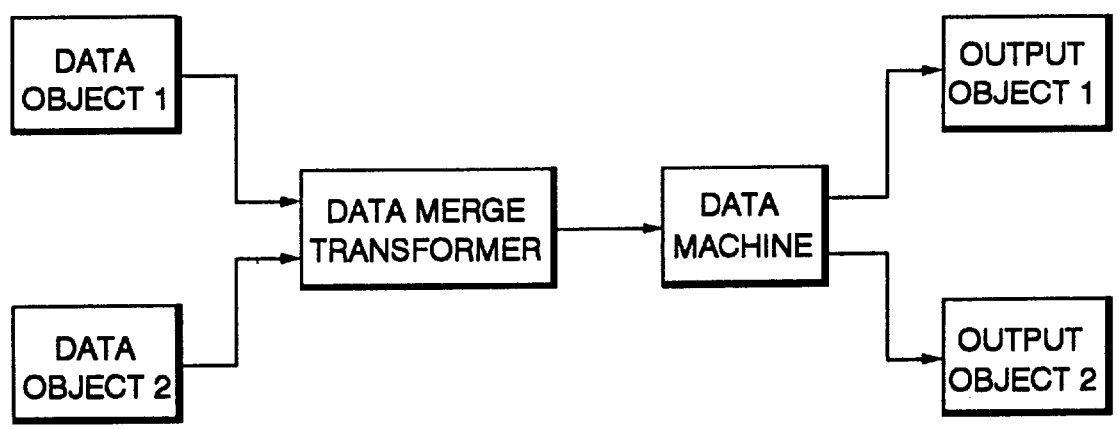
FIG. 4 illustrates the use of a transform object between the data object and the data machine.

These transform objects can be added into the chain, either before or after the Data Machine, to perform traditional Database Queries. A Data Machine may be configured to accept one or more input tables (in the relational sense). The typical database Query is, in effect, a two-stage machine process, so transform objects can be added between the data source and the Data Machine, or between the Data Machine and the Viewer object(s), to perform database row and column select and join functions. Other objects can calculate new columns, order and sort the data, and so on; FIG. 4 illustrates the inclusion of transform objects, such as a data merge object, in the chain. Provided that the interfaces between these objects are specified (for example, using the industry-standard Structured Query Language, SQL), the entire data access and presentation capability is kept open for users and vendors to extend.

Figure 2:
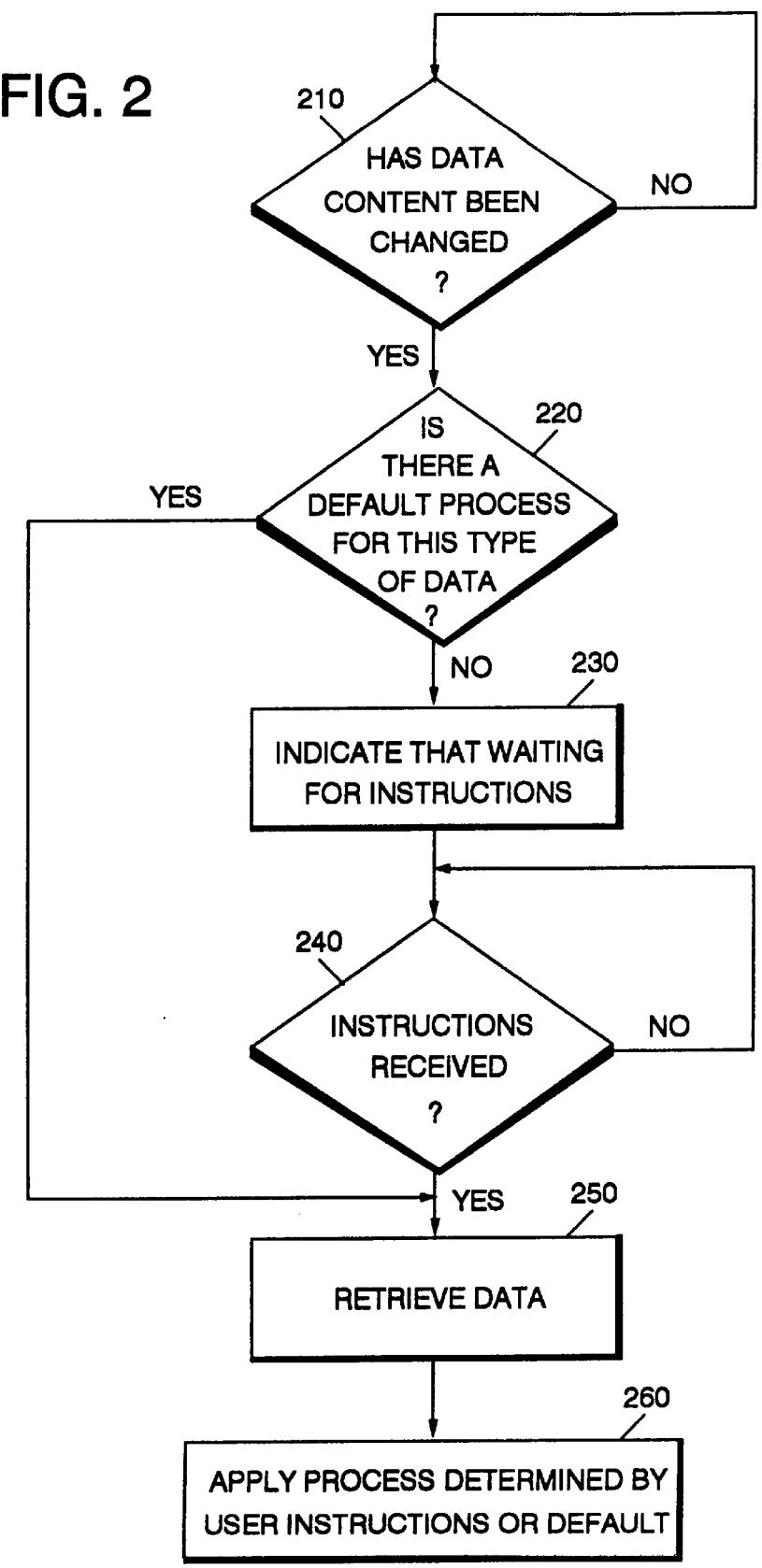
FIG. 2 is a flow diagram illustrating the operation of the data machine according to the preferred embodiment of the present invention.

The process carried out by the data machine of the preferred embodiment will now be described in more detail with reference to FIG. 2. At step 210, the data machine determines whether the data content received by the data receiving means 70 has changed. The Data Machine detects when there has been a change in the content of the input data, but until that data changes (or new input data is connected), the Data Machine remains idle.

Once the data has changed, the Data Machine checks at step 220 whether there is a pre-defined default process for retrieving this type of data. If there is, then the data receiving means 70 is used to retrieve the data at step 250. If there is not, the Data Machine indicates to the user at step 230 that it is waiting for further instructions on how to retrieve the data. For instance, a prompt may appear on the display device 20, either on or in proximity to the data machine object.

At step 240, received user instructions to the Data Machine regarding how to retrieve the data are shown (what process to use, if applicable, and what filters and operations to apply to the incoming data, if any). This is done through the end user "physical" interface shown in FIG. 6. Once the relevant details have been entered at step 240, the Data Machine then acts on the user's instructions, perhaps prompting the user for further clarification if necessary. This will involve retrieving the data at step 250 according to either the default process or the user's instructions. Finally, any processes determined by the user or by the default process are then applied to the data at step 260 by the processor 90 before data is passed on to the output object.

Figure 5:
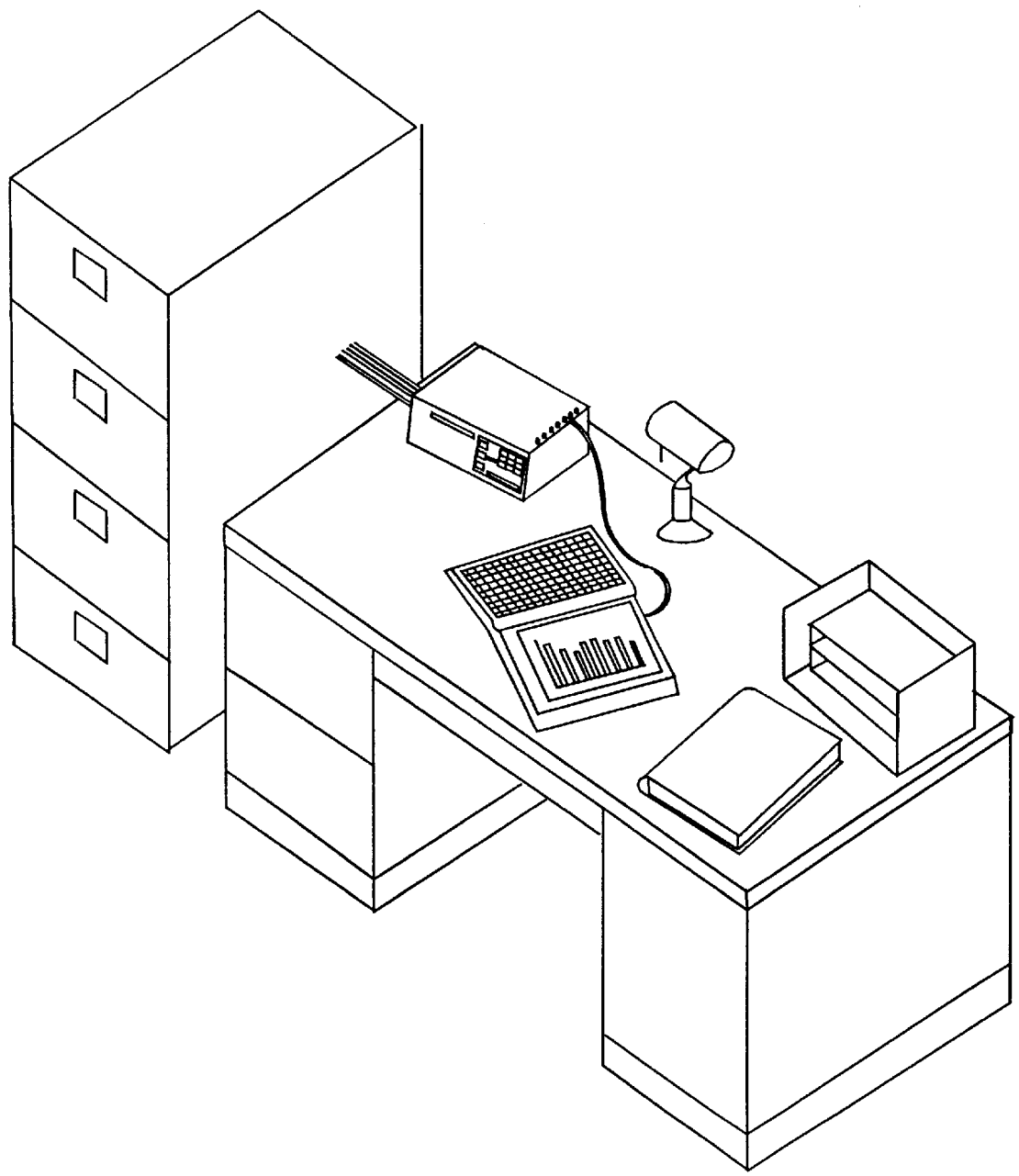
FIGS. 5 and 6 are pictorial representations of a computer screen showing a Places user interface in accordance with the preferred embodiment of the present invention.

FIG. 5 illustrates how a Data Machine could be represented within a Places environment. The Data Machine is positioned on a desk within a Place. FIG. 5 also shows data connected into the Data Machine (in this case from a filing cabinet which represents a database) and output from the Data Machine to a viewer for display of that data (the book); the facing pages of the book show a spreadsheet and a graphical chart. Further, a control panel is shown on the Data Machine by means of which the user passes instructions to the Data Machine—this panel is shown in more detail in FIG. 6.

The single Data Machine object can produce a variety of outputs for many different kinds of reports, charts, etc. Examples of these are shown in FIG. 5 as pages in the book. Each output graphically declares to the player its required column inputs. A construction diagram on the control panel of the Data Machine is used to create connections for the input columns graphically to the appropriate parts of the output.

This construction diagram is a graphical 'parts' or 'construction' view, and is interactive so the user can perform operations such as 'wiring' directly on the view itself. Other user actions that the view on the Data Machine may perform include layering, exploding the diagrammatic depiction of the connections, selectively showing and hiding parts and connections, and so on.

Figure 6:
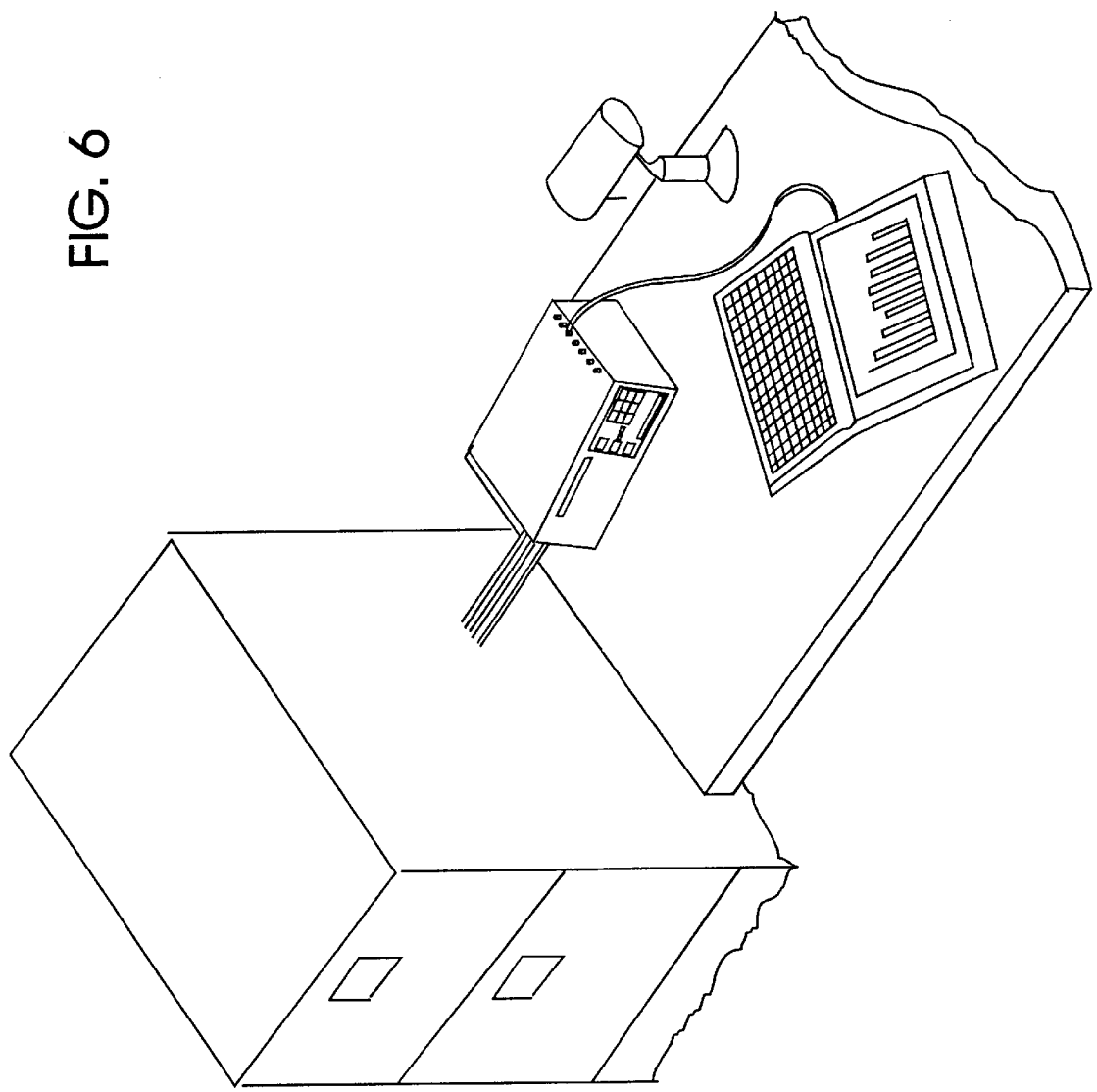

FIG. 6 shows a more detailed view of the Data Machine showing columns of data linked in from the database, and out to axes of a chart. The construction diagram appears on the panel of the Data Machine, as will be discussed in more detail below. It will be apparent that the user can change the 'wiring' as desired to select different input data and different output objects.

With particular reference to the construction diagram illustrated on the Data Machine control panel shown in FIG. 6, three icons 300 can be seen on the left hand-side of the panel. These icons represent the various types of data that can be retrieved from the database through the connections between the database and the Data Machine. The two icons 310 in the middle of the control panel indicate that the Data Machine is currently connected to a chart output, as indeed is apparent from the wire passing from the Data Machine to the book of outputs. The line 320 to the right of the lower of the three data icons indicates that the data corresponding to that icon is the data which is currently being passed through the Data Machine. The number 288 (reference 330) on the panel indicates that 288 lines of data have currently been read by the Data Machine. The matrix 340 of six boxes at the top right of the control panel indicates which output sockets of the Data Machine are currently being used.

The system of the preferred embodiment includes a Data Machine providing a new, intuitive, mechanism for the user of a system providing a Places environment to connect data, such as relational data, to output objects. The outputs are extensible, so that, over time, new data sources and output objects can be added in a similar way to adding a new template in today's workplace environment. Other part vendors can add to the output list via an open API.

The Data Machine simplifies the user's interactions with and access to data, and provides a common mechanism for connecting any input data to any output objects, optionally processing that data on the way. It also provides a mechanism for performing relational database queries in a vastly simplified manner adhering to a concrete, accessible, real-world metaphor. Therefore, having described our invention with reference to the preferred embodiment, what is set forth in the appended claims is by way of description only and not of limitation.

Wherefore what is desired to be protected by Letters Patent and what is claimed is:

1. A system for displaying, on a display device (20) connectable to the system, a visual representation of a physical environment, the system having display means (30) for displaying objects in the physical environment including a data management object, one or more data objects representing data sources, and one or more output objects representing means through which data from a data source can be presented to a user, a user-operated device (50) being connectable to the system to allow the user to interact with the objects, the system further comprising:

data receiving means (70), responsive to signals from the user-operated device (50) indicating user association of said one or more data objects with said data management object, to access and receive the data represented by said one or more associated data objects;

processing means (90) for performing selected processing operations on said retrieved data; and output means (100) for passing the said data processed by said processing means to a selected said output object.

2. A system as claimed in claim 1, wherein said data management object has data manipulation controls displayed in association therewith, said selected processing operation performed by said processing means (90) being determined by a user selection of said data manipulation controls.

3. A system as claimed in claim 2, wherein said data manipulation controls are incorporated as part of said data management object.

4. A system as claimed in claim 2 or claim 3, wherein said data manipulation controls enable data queries to be specified by the user.

5. A system as claimed in claim 4, wherein said display means (30) is also arranged to display connection leads in the physical environment, said user association of one or more said data objects with said data management object resulting from user manipulation, via said user-operated device (50), of a said connection lead to connect a said data object with said data management object.

6. A system as claimed in claim 5, wherein said physical environment is represented as a three-dimensional environment.

7. A system as claimed in claim 6, wherein said physical environment represented is a work area.

8. A system as claimed in claim 7, wherein said output object is selected by the user via said user-operated device (50).

9. A system as claimed in claim 8, wherein said data management object is represented as an intuitive real-world object.

10. A computer-executable software tool recalled on a machine-readable medium for use in a system as claimed in claim 9, the tool comprising steps for:

specifying to said display means (30) the form of said data management object to be displayed in said physical environment;

specifying said data receiving means (70); and specifying said processing means (90).

11. A method of operating a data processing system arranged to display on a display device (20), connectable to the system, a visual representation of a physical environment, said method comprising steps of:

a) employing a display means (30) to display objects in the physical environment including a data management object, one or more data objects representing data sources, and one or more output objects representing means through which data from a data source can be presented to a user;

b) employing a data receiving means (70) to access and retrieve said data represented by said one or more associated data objects, responsive to signals received from a user via a user-operated device (50) connectable to the system indicating user association of one or more data objects with the data management object;

c) employing a processing means (90) to perform selected processing operations on said retrieved data; and d) passing said data processed by said processing means to a selected said output object.

* * * * *

UNITED STATES PATENT AND TRADEMARK OFFICE
CERTIFICATE OF CORRECTION

PATENT NO. : 5,808,612
DATED : September 15, 1998
INVENTOR(S) : Roland Albert Merrick et al It is certified that error appears in the above-identified patent and that said Letters Patent is hereby corrected as shown below:

Column 10, line 7  change "recalled" to -- recorded --.

Signed and Sealed this

Twenty-third Day of February, 1999

Attest:

Q. TODD DICKINSON

Attesting Officer

Acting Commissioner of Patents and Trademarks